Figure 1:
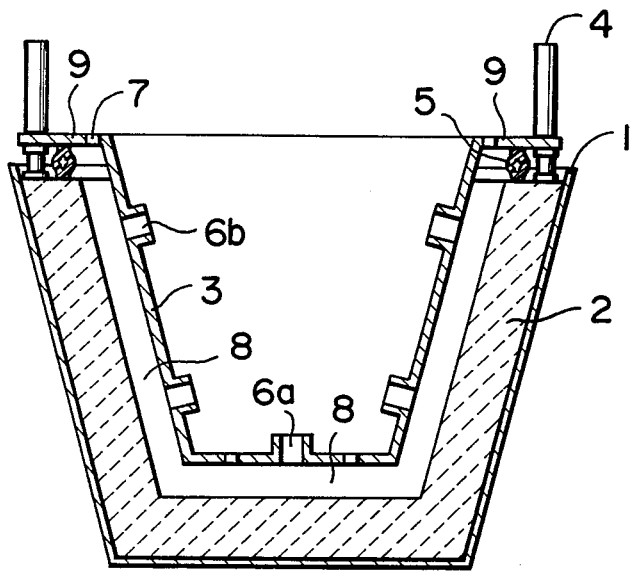

United States Patent [19]

Takashima et al.

[11] Patent Number: 4,469,309

[45] Date of Patent: Sep. 4, 1984

[54] CORE FOR BLOW-FORMING THE LINING OF VESSEL FOR MOLTEN METAL, A LINING METHOD USING SAID CORE, AND A LINING COMPOSITION USED IN SAID LINING METHOD

[75] Inventors: Masaru Takashima, Komae; Shigeru Matsuyama, Oyama; Yoshihiro Hayashi; Hisaji Ito, both of Ohtsu; Kotaro Fujita, Suita; Kenji Inai; Shoji Takemoto, both of Ohtsu, all of Japan

[73] Assignee: Aikoh Co., Ltd., Tokyo, Japan

[21] Appl. No.: 347,935

[22] Filed: Feb. 11, 1982

[51] Int. Cl.³ .................................................. B22C 9/12
[52] U.S. Cl. ....................................... 266/44; 266/280; 266/281; 264/30
[58] Field of Search ............... 266/280, 281, 44, 286, 266/283, 45, 284, 282, 285; 425/522, 543; 264/30, DIG. 33, 31, DIG. 67; 249/175, 142; 164/33, 37, 39, 21; 432/248

[56] References Cited

U.S. PATENT DOCUMENTS 3,878,142  4/1975  Tisza .................................... 264/30
3,917,110 11/1975  Kiguchi ................................ 266/280
3,944,193  3/1976  Imai et al. ............................ 266/281
4,042,229  8/1977  Eccleston ............................. 266/280

FOREIGN PATENT DOCUMENTS 0756466  3/1971  Belgium ............................... 266/280
2050736  3/1971  France ................................. 266/281

Primary Examiner—L. Dewayne Rutledge
Assistant Examiner—S. Kastler
Attorney, Agent, or Firm—Fay & Sharpe

[57] ABSTRACT

A core for blow-forming the lining of a vessel for molten metal, which core is provided with a main body having blow-in holes and an exhaust port, the side face and the lower faces of said body having the same dimensions and shapes as those of the inside of the lining of said vessel for molten metal, a flange mounted approximately horizontally in the outer direction at the periphery of the upper end of said main body, a plurality of supports which are actuated downwardly from said flange, and airtight and shock absorbers mounted beneath said flange, a lining method which uses said core, and a lining composition used in said lining method.

5 Claims, 2 Drawing Figures

CORE FOR BLOW-FORMING THE LINING OF VESSEL FOR MOLTEN METAL, A LINING METHOD USING SAID CORE, AND A LINING COMPOSITION USED IN SAID LINING METHOD

This invention relates to improvements in or relating to a core for blow-forming the consumable lining of vessel for molten metal, a lining method which uses said core, and a lining composition used in said lining method.

In vessels for molten metal such as ladle and tundish for molten iron or steel, the inside of their outer iron shells is lined with bricks or castable refractory as a refractory lining material, and further said bricks or castable refractory are lined with a consumable lining material which also serves as a heat-insulating material. Said consumable lining refractory is used for a single charge only and it is replaced by new one for each charge. Accordingly, said consumable lining refractory must be frequently replaced so that the working efficiency for the lining is one of the important factors for determining the structural scale of equipments in this field. The lining method is mechanized to accelerate the working efficiency as described above, and there are employed a casting method, a core-vibration forming method and the like. However, to make a tough stamping a high pressure or heavy weight core must be used and it requires a longer period of time for the stamping, so that specific structure and/or pressure device are required for the lifting of the core, and therefore a few units of comparatively large-scaled lining apparatus must be usually installed to increase the working efficiency though there is a working reliability thereby requiring a wide working area. As another example there are used heat-retaining boards in which a consumable lining material is previously formed board-like and dried, but it is known that a corrosion proceeds far to the refractory lining material after several charges and that troublesome steps must be taken for repairing the refractory lining material and for the cutting work, arrangement, jointing and adhesion of said heat-retaining boards whereby this method does not contribute for shortening the repair time of lining.

The present invention has been made to solve the various disadvantages of the conventional methods. The invention uses a core for blow-forming a consumable lining of specifically constructed vessel for molten metal and a lining composition referred to later, and it is possible to carry out said consumable lining easily, positively and in a shorter period of time.

Figure 2:
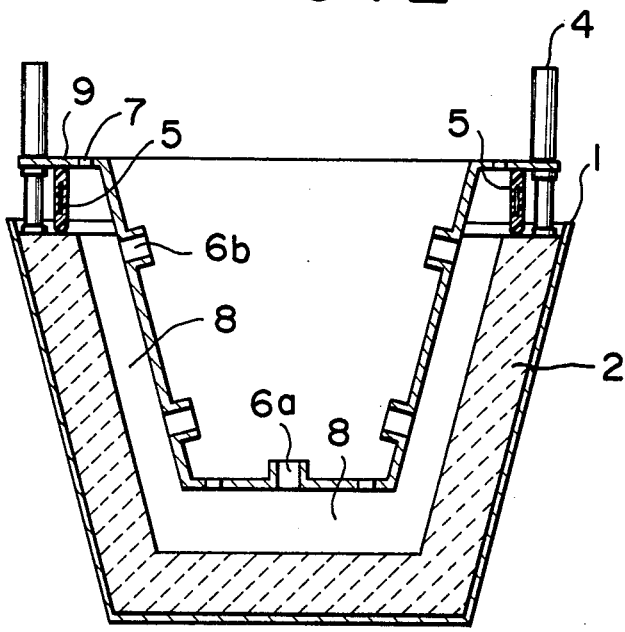

The invention will now be described in detail with reference to the accompanying drawings, in which:

FIG. 1 is a vertical sectional view of an example of core for blow-forming, showing a mode in which said core is set in a continuous casting tundish to be repaired; and FIG. 2 is a vertical sectional view similar as in FIG. 1, showing another example of core.

In FIG. 1, a refractory lining material 2 is lined close to a tundish shell 1, and the height of a core body 3 is adjusted by extending or contracting a support 4, in such a way that the side face and the lower face of the core body 3 may form a space 8 for applying the consumable lining material onto the surface of said refractory lining material 2. The support 4 is mounted in such a manner that it may operate beneath a flange 9 mounted approximately horizontally from the neighborhood of the upper end of said core body 3, and it is actuated by cylinder, gear, link, lever and the like which use a fluid pressure such as of air, water, oil, etc. Further, an airtight and shock absorber 5 is provided beneath the flange 9 to prevent the formation material blown into the space 8 from ejection. The airtight and shock absorber 5 is made of elastic material such as rubber and plastics, and it shuts off, thanks to the weight of the core itself, communication with the outside, at the upper end of the refractory lining material of vessel for molten metal, except with the space 8, blow-in holes 6a, 6b and an exhaust port 7. The core body is made of non-plastic material such as metal, wood or plastics, it is not subject to a deformation by static pressure or kinetic pressure at the time of blow-in formation, and it will suffice to have a self-weight not to move from the installed position, so that it will be all right to increase the weight with a dead-weight in the case of thin thickness. The core is first suspended above the space of tundish by suspending means such as crane, it is then lowered into the space, a horizontal position is determined to accurately form the void to be formed, and the leg height of said support 4 is adjusted in such a manner that the height i.e. the thickness of the bottom lining may become either the same as the thickness of the side or a desired thickness. The blow-in formation is carried out by blowing the formation material through the blow-in holes 6a, 6b from a piping (not shown) by a high pressure gas such as compressed air. Practically the blow-in is effected first from the hole 6a at the bottom so as first to form the bottom part, and then the blowing position is gradually shifted upward from the lower portion of the blow-in hole 6b at the side. Exhaust air is discharged from the exhaust port 7, and the port is provided with a slit plate having slender spaces thereby to avoid the escape of solids. An air pressure more than 2 Kg/cm$^2$ will be sufficient to solidify the moulding. Since a binder with which the formation material hardens is used the material immediately begins after blowing, and therefore it is possible to remove the core almost immediately after the blowing. A small amount of water in the formation material will evaporate owing to its own exothermic reaction while hardening so that a drying operation is not needed separately.

According to the invention a co-use of the present method with conventional vibration formation method will be all right. As shown in FIG. 2, there is provided a larger space 8 at the bottom, the space is filled with the formation material, and then a vibrator (not shown) is operated while applying the weight of the core thereby to blow form the side, when the material at the side is mixed with the material coming up to the side face from the bottom due to the weight of the core, whereby a lining is completed.

A lining composition according to the invention is a mixture which is tightly adhered to the ground in applying a lining to the vessel for molten metal, powdery or granular, of either no water content or much less water content, and quickly hardens after moulding. That is, the composition is the one which contains an aggregate and a self-hardening resin binder or which contains a hardener, too. It will accelerate the start of hardening to mix a small amount of acid into the self-hardening resinous binder just before blowing the formation material. For example, a phenol resin is added, by about half amount, with a mixture of xylenesulfonic acid and a small amount of mineral acid.

The aggregate is an acid, neutral or basic refractory such as silica, siliceous sand, chamotte, graphite, alumina, corundum, mullite, spinel, dolomite, magnesia, calcia, chromia, zirconia, brick or ore, said refractory having a particle size of less than 3 mm sieving and being in a mixing range 45~97%. Particle size larger than 3 mm brings about a maldistribution when blowing so that it is not preferable. With a mixing amount over 97% of the aggregate, the resinous binder retains the strength of lining at room temperature as a blow-formation lining material so as not to be released even by the external force applied when the core is withdrawn, or the binder becomes short of strength when the molten steel is received allowing the aggregate to release owing to combustion. Further, if the aggregate is less than 45% the lining is short of refractory degree to be unsuitable again.

As the self-hardening resin binder there may be mentioned, phenol resin, furan resin or unsaturated polyester resin, but in most cases there is used a mixture which enhanced the hardening rate by adding a hardener based on about 50% xylenesulfonic acid to phenol resin. The mixing ratio of the self-hardening resin binder needs at least 3%. With the percentage below it the strength is imperfect irrespective of the particle size and shape of the aggregate, and even if the ratio exceeds 15% the strength is not enhanced.

Preferably the hardener is used to harden the formation material in considerably shorter period of time after it has been mixed, so that for example, the hardener may be added to the composition in the screw feeder or said resin and said hardener may be added in the feeder through separate ports. The outlet in the feeder is situated close to a blow-in nozzle and the composition is passed through the piping by a compressed air, when it is filled into the space between the core and the vessel wall. The core is removed after the composition has been solidified to such an extent that even if the core is removed the lining layer may not release. It is also possible to employ the self-hardening resin and a thermosetting resin in combination, effecting a drying and a hardening by blowing a hot gas to the surface of the lining layer after the removal of said core, whereby the lining layer is more strengthened. There are various thermosetting resins, but the resin commercially most usable is the one in which phenol resin contains less than 20% hexamethylenetetramine as a hardener.

If fluidity is too high both the self-hardening and thermosetting resins enter into the pores in case the aggregate is porous when an extra mixing is forced. Accordingly, to decease the fluidity the solvent in the resins is lessened, and both the self-hardening and thermosetting resins should be of more than 70% non-volatile ingredients at 135° C., allowing the fluidity not to be too high at room temperature or when heat hardening. Additionally, to maintain the mechanical strength of the lining layer, there are used, as secondary binder when receiving the melt, more than one inorganic binders such as magnesia sulphate heptahydrate ($MgSO_4.7H_2O$) soda phosphate, magnesia phosphate, boric acid, borax, and soda metasilicate. For example, magnesia sulphate heptahydrate liberates crystal water at about 70° C. to give a humidity to the mixture so that a raw strength occurs, and it loses crystal water at about 200° C. so as to harden, and therefore the strength of the lining layer can be maintained even after the resinous binder has been burned to lose its adhesive power when the vessel for molten metal has been preheated. With less than 3% of the secondary binder in mixing ratio the adhesive power is dissatisfactory, but even with more than 15% the strength of the lining layer does not increase so that an extra use thereof will be wasteful.

Furthermore, said composition is mixed occasionally, as a heat-insulating material, with more than one selected from among the refractory fibers such as asbestos, rock wool, glass wool, kaolin fiber, slag wool, carbon fiber, zirconia fiber, silicon carbide fiber, the porous refractories such as diatomaceous earth, pearlite, hollow alumina, and pumice, and the organic substances such as saw dust, wood chips, cellulose fiber, synthetic fiber, charcoal, coal, and coke. These substances decrease the bulk density in forming the lining or are burned when the melt is received, to decrease the total bulk density, leaving the pores, and to further improve the heat retention of the lining layer. Since the bulk density is decreased already at the time of high temperature by the resins, said heat-insulating material is to be mixed in the range within 2% to retain the mechanical strength to such an extent as to be bearable for use.

The invention will now be described by way of example.

Vessel for molten metal:
  500 mm width×750 mm height×6,00 mm length (inside);
  Continuous steel casting tundish;
  The lining portion is 40 mm thickness from the surface of the permanent lining bricks.
Mixing trough: Edge runner mill type roller mixer.
Feeding machine: Mechanism in which a compressed air supply pipe is communicated with the blow-in opening of a blow-in pipe connected to the lower portion of a feed tank by a screw feeder.

Mixtures (Part by weight):

| | |
|---|---|
| (1) Siliceous sand of less than 3 mm∅ (particle state, porosity: 1.2%) | 100 parts |
| Self-hardening resin liquid (phenol resin, non-volatile ingredients: 75%) | 4 parts |
| Xylenesulfonic acid hardener (methanol: 15%, nitric acid: 5%, purity: 80%) | 2 parts |
| (2) Magnesia brick powder of less than 3 mm∅ (particle state, porosity: 24%) | 100 parts |
| Self-hardening resin (phenol resin non-volatile ingredients: 75%, xylole: 25%) | 5 parts |
| Thermosetting resin (non-volatile ingredients: 90%, hexamine: 10%) | 5 parts |
| Xylenesulfonic acid hardener (methanol: 15%, nitric acid: 5%, purity: 80%) | 2.5 parts |
| Magnesia sulphate heptahydrate | 5 parts |

Mixing:

In the mixture (1) above the silicic sand is charged into the feed tank of the feeding machine, while the self-hardening resin and the hardener are separately added by the screw feeder at the lower portion.

In the mixture (2) above, the brick powder, the thermosetting resin and the magnesia sulphate are charged into a mixing tank, the mixture is stirred for 5 minutes, and then it is charged into the feed tank of the feeding machine, while as in the mixture (1) above the self-hardening resin and the hardener are added separately by the screw feeder at the lower portion.

Blowing:

The formation material is blown, by gas pipes of ¾ inch ϕ under an air pressure of 5 Kg/cm², from a blow-in nozzle directly connected to the outlet of the screw feeder into a space between the refractory brick wall of tundish lining and the core, while 1500 Hz vibrations are given to the core.

Removal of the core:

The core is removed 10 minutes after the blowing. Vibrations are given only when the core is removed.

Drying:

(1) 30 minutes drying under heated air at 100° to 120° C.

(2) 30 minutes drying under heated air at 150° to 200° C.

Physical properties of moulded consumable lining:

Samples of 50φ×50 mm (height) were taken from corners of formed lining layers, to measure their porosity, bulk density, thermal conductivity and hot compression strength. The mean values of 10 charges are shown in the following table.

|  | (1) | (2) |
|---|---|---|
| Porosity: | 23% | 40% |
| Bulk density: | 2.35 | 1.95 |
| Thermal conductivity: | 0.75 Kcal/mHrC | 0.35 Kcal/mHrC |
| Hot compression strength (1500° C.): | 0.17 Kg/cm$^2$ | 0.25 Kg/cm$^2$ |

In the sample (1) above the thermal conductivity is comparatively high but the cost is low so that the lining is suitable for an electric furnace where the temperature is freely adjustable. On the other hand, in the sample (2) above the conditions are just reverse and the lining retains heat well so that it is suitable for an converter or open-hearth furnace where it is somewhat difficult to adjust the temperature.

Said blow-in formation could be completed by a single worker in one hour. Further, it was found that said consumable lining did not damage the refractory lining material of the tundish at all even if five continuous castings were carried out.

Additionally, as in a vessel for non-ferrous metal melts, if a refractory lining is not required, it will be apparent to the skilled in the art that it is also covered by the present invention to form a space between the shell of said vessel and the core of the invention.

What is claimed is:

1. A core for blow-forming the lining of a vessel adapted to contain molten metal, which core is provided with a main body having blow-in holes and an exhaust port, the side face and the lower faces of said body having essentially the same dimensions and shape as the inside lining of said vessel for molten metal, a flange mounted approximately horizontally in the outer direction at the periphery of the upper end of said main body, a plurality of supports which are actuated downwardly from said flange, and shock absorber means mounted beneath said flange adapted to engage said vessel for molten metal to form an essentially airtight seal between said flange and said vessel for molten metal.

2. A core for blow-forming the lining of a vessel for molten metal according to claim 1 in which the main body is provided with a dead-weight.

3. A core for blow-forming the lining of a vessel for molten metal according to any of claims 1 or 2 in which the main body is provided with a vibrator having the number of vibrations in the range 1,000~10,000 per minutes and an amplitude in the range 0.1~5 mm.

4. A method for lining a vessel for molten metal, which comprises the steps of inserting and arranging, from the opening portion of the vessel, a core for the blow-formation which is provided with a main body having blow-in holes and an exhaust port, the side face and the lower faces of said body having essentially the same dimensions and shapes as those of the inside of the lining of said vessel for molten metal, a flange mounted approximately horizontally in the outer direction at the periphery of the upper end of said main body, a plurality of supports which are actuated downwardly from said flange, and shock absorbers mounted beneath said flange adapted to engage said vessel for molten metal to form an essentially airtight seal between said flange and said vessel for molten metal, and blowing a mixture consisting of an aggregate, a self-hardening resin and a hardener into a space formed between the outer periphery of said core and the inner surface of said vessel thereby to fill the space.

5. A method for lining a vessel for molten metal according to claim 4 in which a mixture containing a thermosetting resin is blown by a compressed air to fill the space, between said core and said vessel and then the surface of the lining from which the core has been removed is heated further to harden the lining layer.

* * * * *